(No Model.)
J. L. LORD.
PAINTER'S FENDER.
No. 533,392.
Patented Jan. 29, 1895.
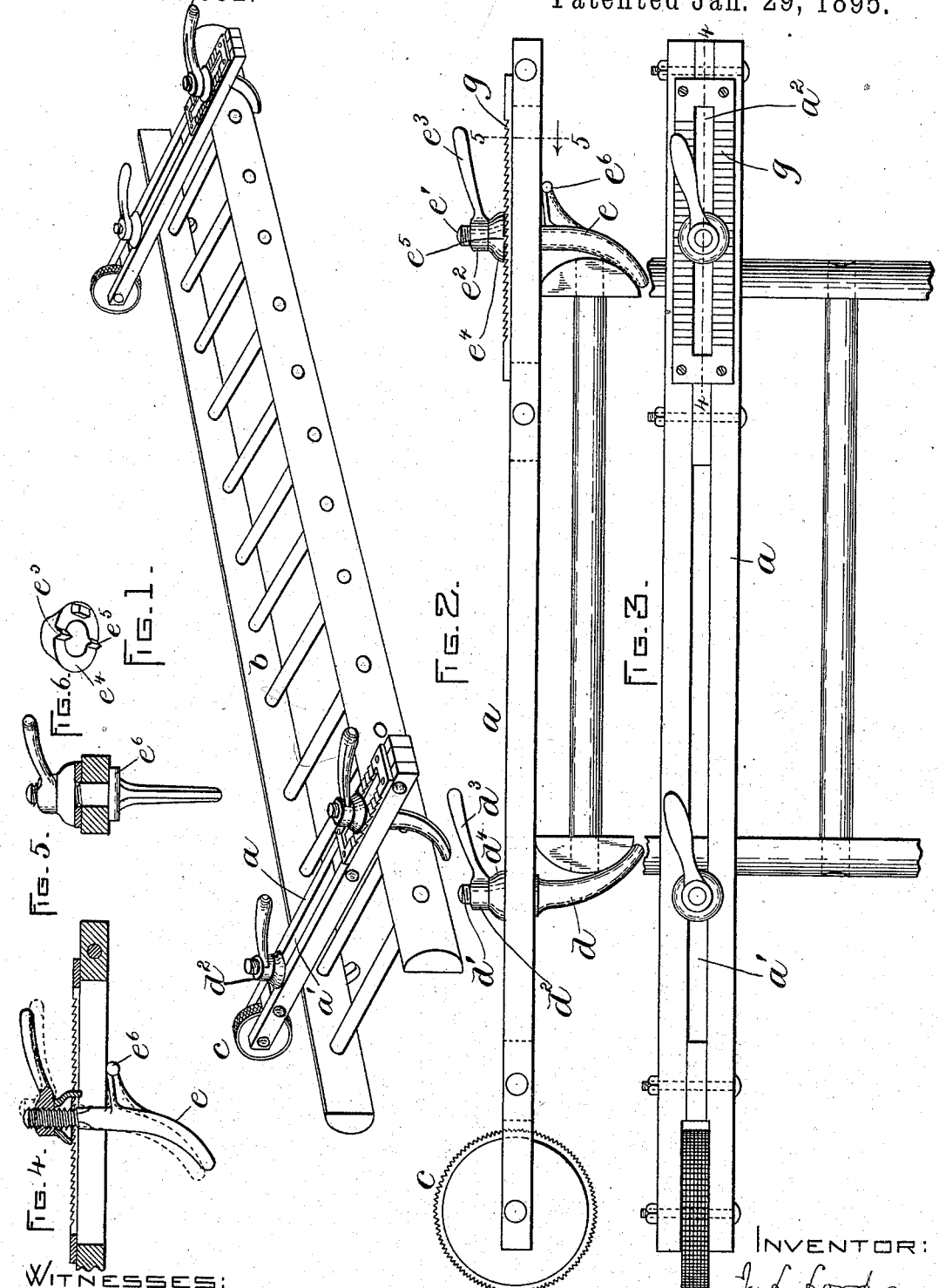
WITNESSES:
A. D. Harrison
Rollin Abell
INVENTOR:
J. L. Lord
by Wright Brown & Quinby
Attys

UNITED STATES PATENT OFFICE.

JAMES L. LORD, OF LYNN, MASSACHUSETTS.

PAINTER'S FENDER.

SPECIFICATION forming part of Letters Patent No. 533,392, dated January 29, 1895.

Application filed September 14, 1894. Serial No. 523,016. (No model.)

*To all whom it may concern:*

Be it known that I, JAMES L. LORD, of Lynn, in the county of Essex and State of Massachusetts, have invented certain new and useful Improvements in Painters' Fenders, of which the following is a specification.

This invention relates to fenders which are used on suspended platforms or stagings used by painters, the object of the fender being to keep the staging, which is usually a ladder suspended horizontally, from striking the side of the building on which the painters are at work.

My invention has for its object to provide a fender which is capable of being quickly applied to or removed from the platform or ladder, and when in place will be securely engaged with the platform.

To these ends the invention consists in the improvements which I will now proceed to describe and claim.

Of the accompanying drawings, forming a part of this specification, Figure 1 represents a perspective view of a painter's platform provided with fenders of my improved construction. Fig. 2 represents an end elevation of the platform, and a side view of one of the fenders. Fig. 3 represents a top plan view of the parts shown in Fig. 2. Fig. 4 represents a section on line 4—4 of Fig. 3. Fig. 5 represents a section on line 5—5 of Fig. 2, looking toward the left. Fig. 6 represents a perspective view of the washer or support hereinafter referred to.

The same letters of reference indicate the same parts in all the figures.

In the drawings—$a$ represents a bar, which is or may be constructed of wood, and is of sufficient length to extend across the platform or staging $b$, the latter being here shown as an ordinary ladder, this being the form of platform or staging usually employed by painters in working on vertical surfaces at considerable heights from the ground. The bar $a$ is provided at one end with a suitable buffer $c$, which is here shown as a wheel journaled in one end of the bar and provided with a corrugated rubber tire.

$d$ represents an arm suitably affixed to the bar $a$ and projecting downwardly therefrom in position to bear against a part of the platform $b$, said arm being here shown as formed to bear against the curved outer side of one of the side-pieces of the ladder. The arm $d$ is preferably adjustably secured to the bar, said arm having a screw-threaded shank $d'$ which passes through a slot $a'$ in the bar and is clamped to the bar by means of a nut $d^2$ engaged with the shank $d'$ and provided with an operating handle $d^3$, the said nut bearing on a washer $d^4$ which bears on the upper side of the bar $a$. By loosening the nut and moving the arm $d$ along the slot $a'$, said arm can be adjusted as desired.

$e$ represents another arm formed to be engaged with another part of the platform $b$, said arm $e$ being here shown as curved and formed to engage the outer side of the other side-piece of the ladder. The arm $e$ is provided with a screw-threaded shank $e'$ at its upper end, upon which is a nut $e^2$ having an operating handle $e^3$. The nut bears upon a washer or support $e^4$ which has on its under side teeth $e^5 e^5$ formed to engage the teeth of a ratchet-toothed plate $g$ affixed to the bar $a$. The shank $e'$ passes through the washer $e^4$ and is considerably smaller than the orifice through said washer, so that the arm $e$ can oscillate to a considerable extent in the washer, the latter serving as a support from which the arm $e$ is suspended by means of the nut $e^2$. The arm $e$ is provided with an offset fulcrum $e^6$ which bears against the under side of the bar $a$ and is formed so that when the arm $e$ is raised by screwing down the nut $e^2$, the fulcrum will cause the arm to swing sidewise as indicated by the dotted lines in Fig. 4. The operation of turning down the nut $e^2$ therefore forces the arm $e$ firmly against one of the side-pieces of the ladder, and thus causes the two arms $d$ and $e$ to co-operate in firmly grasping the ladder and rigidly securing the fender thereto.

The teeth $e^5$ on the support or washer $e^4$ and the corresponding teeth on the plate $g$ constitute means for locking the arm $e$ to the clamp in any position to which it may be adjusted and for permitting the quick adjustment of said arm, the shank $e'$ of the arm passing through a slot $a^2$ in the bar, so that when the nut $e^2$ is loosened or turned upwardly the arm $e$ and its attachments can be quickly moved along the bar in either direction.

The fender is applied to the platform or ladder in the following manner: The arm $e$ being loosened and moved back, the fender is placed across the ladder and the arm $d$, which has previously been secured to the bar $a$ in the desired position, is brought to bear against one of the side-pieces of the ladder. The loosened arm $e$ is then moved up into contact with the other side-piece of the ladder, and the nut $e^2$ is then turned down, causing the described lever action of the arm $e$, and pressing it firmly against the side-piece on which it bears, the fender being thus securely clamped to the ladder. The lever action of the arm $e$ is illustrated by the full and dotted lines in Fig. 4, the full lines showing the arm $e$ in the position which it may occupy when loose, or before it has been swung inwardly by the tightening of the nut $e^2$, while the dotted lines show the position said arm may occupy after the nut $e^2$ has been turned down.

I do not limit myself to the details of construction here shown and described, and may variously modify the same without departing from the spirit of my invention.

I claim—

1. A painter's fender comprising a bar, a buffer at one end of the bar, a platform-engaging arm suitably affixed to the bar and adapted to bear on a part of a painters' platform or stage, a washer or support adapted to slide on the bar, and another platform-engaging arm formed to pass through and oscillate in said support and provided with an offset fulcrum bearing against the under side of the bar and with a nut bearing on the said washer or support, as set forth.

2. A painter's fender comprising a bar having a slot and a ratchet-toothed plate, a buffer at one end of the bar, a platform-engaging arm suitably affixed to the bar, a washer or support movable on the bar and having a tooth formed to engage said toothed plate, and another platform-engaging arm formed to pass through and oscillate in said support and provided with an offset fulcrum bearing against the under side of the bar and with a nut bearing on the said washer or support, as set forth.

In testimony whereof I have signed my name to this specification, in the presence of two subscribing witnesses, this 8th day of September, A. D. 1894.

JAMES L. LORD.

Witnesses:
 C. F. BROWN,
 A. D. HARRISON.